US012629553B2

(12) United States Patent
Choi et al.

(10) Patent No.: US 12,629,553 B2
(45) Date of Patent: May 19, 2026

(54) EXTENDED REALITY-BASED FIRE TRAINING METHOD AND APPARATUS

(71) Applicant: INDUSTRY ACADEMY COOPERATION FOUNDATION OF SEJONG UNIVERSITY, Seoul (KR)

(72) Inventors: Soo Mi Choi, Seoul (KR); Ho San Kang, Seoul (KR); Jong Won Lee, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 790 days.

(21) Appl. No.: 18/049,329

(22) Filed: Oct. 25, 2022

(65) Prior Publication Data

US 2024/0123271 A1    Apr. 18, 2024

(30) Foreign Application Priority Data

Oct. 13, 2022    (KR) ........................ 10-2022-0131521

(51) Int. Cl.
*G06T 17/00*         (2006.01)
*A62C 99/00*         (2010.01)
         (Continued)

(52) U.S. Cl.
CPC ...... *A62C 99/0081* (2013.01); *G02B 27/0093* (2013.01); *G02B 27/0101* (2013.01); *G02B 27/017* (2013.01); *G02B 27/0179* (2013.01); *G06F 3/012* (2013.01); *G06T 13/40* (2013.01);

*G06T 15/205* (2013.01); *G06T 17/20* (2013.01); *G06T 19/006* (2013.01);
(Continued)

(58) Field of Classification Search
None
See application file for complete search history.

(56) References Cited

U.S. PATENT DOCUMENTS 9,898,912 B1 *   2/2018  Jordan ................. G06V 40/172
11,128,636 B1 *   9/2021  Jorasch ................. H04W 12/08
(Continued)

FOREIGN PATENT DOCUMENTS

JP             6410378 B1 *  10/2018
KR      10-2018-0012033 A      2/2018
(Continued)

*Primary Examiner* — Paul A D'Agostino

(57) ABSTRACT

An extended reality-based fire training method includes: (a) acquiring each object in a real space acquired through a stereo camera and depth information on each object; (b) reconstructing each object into a 3D mesh object based on each object and the depth information on each object; (c) simulating a virtual fire suppression training augmented reality environment after generating a virtual fire in at least one of the reconstructed 3D mesh objects, and transmitting the simulated virtual fire suppression training augmented reality environment to a head-mounted display device; and (d) operating a virtual fire extinguisher object in a virtual fire suppression training augmented reality environment according to a user manipulation of a real fire extinguisher, and extinguishing a virtual fire object by firing a virtual powder object toward the virtual fire object according to the operation of the virtual fire extinguisher object.

10 Claims, 12 Drawing Sheets

(51) Int. Cl.

| | |
|---|---|
| *G02B 27/00* | (2006.01) |
| *G02B 27/01* | (2006.01) |
| *G06F 3/01* | (2006.01) |
| *G06T 13/40* | (2011.01) |
| *G06T 15/20* | (2011.01) |
| *G06T 17/20* | (2006.01) |
| *G06T 19/00* | (2011.01) |

(52) U.S. Cl.

CPC ................ *G02B 2027/0138* (2013.01); *G02B 2027/014* (2013.01); *G02B 2027/0187* (2013.01); *G06T 2215/16* (2013.01); *G06T 2219/2012* (2013.01)

(56) References Cited

U.S. PATENT DOCUMENTS

| | | | |
|---|---|---|---|
| 2015/0094142 A1* | 4/2015 | Stafford | ................. A63F 13/25 463/31 |
| 2020/0030651 A1* | 1/2020 | Choi | ................. A62C 99/0081 |
| 2020/0175767 A1* | 6/2020 | Stivi | ...................... G08B 25/10 |
| 2020/0210127 A1* | 7/2020 | Browy | ................. G06F 18/214 |
| 2020/0388120 A1* | 12/2020 | Paturu | .................. H04W 4/029 |
| 2021/0020141 A1* | 1/2021 | Yuasa | .................... G06F 3/012 |
| 2021/0158715 A1* | 5/2021 | Kim | ........................ G09B 9/00 |
| 2021/0375053 A1* | 12/2021 | Douglas | ................ G16H 40/20 |
| 2023/0293926 A1* | 9/2023 | Kim | .................. A62C 99/0081 |
| 2025/0055942 A1* | 2/2025 | Nighman | ............. H04M 3/568 |

FOREIGN PATENT DOCUMENTS

| | | |
|---|---|---|
| KR | 10-2137040 B1 | 7/2020 |
| KR | 10-2022-0113207 A | 8/2022 |

* cited by examiner

<u>100</u>

1 VIVE TRACKER
POSITION AND DIRECTION TRACKING SENSOR

2 DM626 SWITCH

4 ARDUINO UNO WiFi R2
SENSOR CONTROL

3 MPU-9265
GYROSCOPE SENSOR

FIG. 12

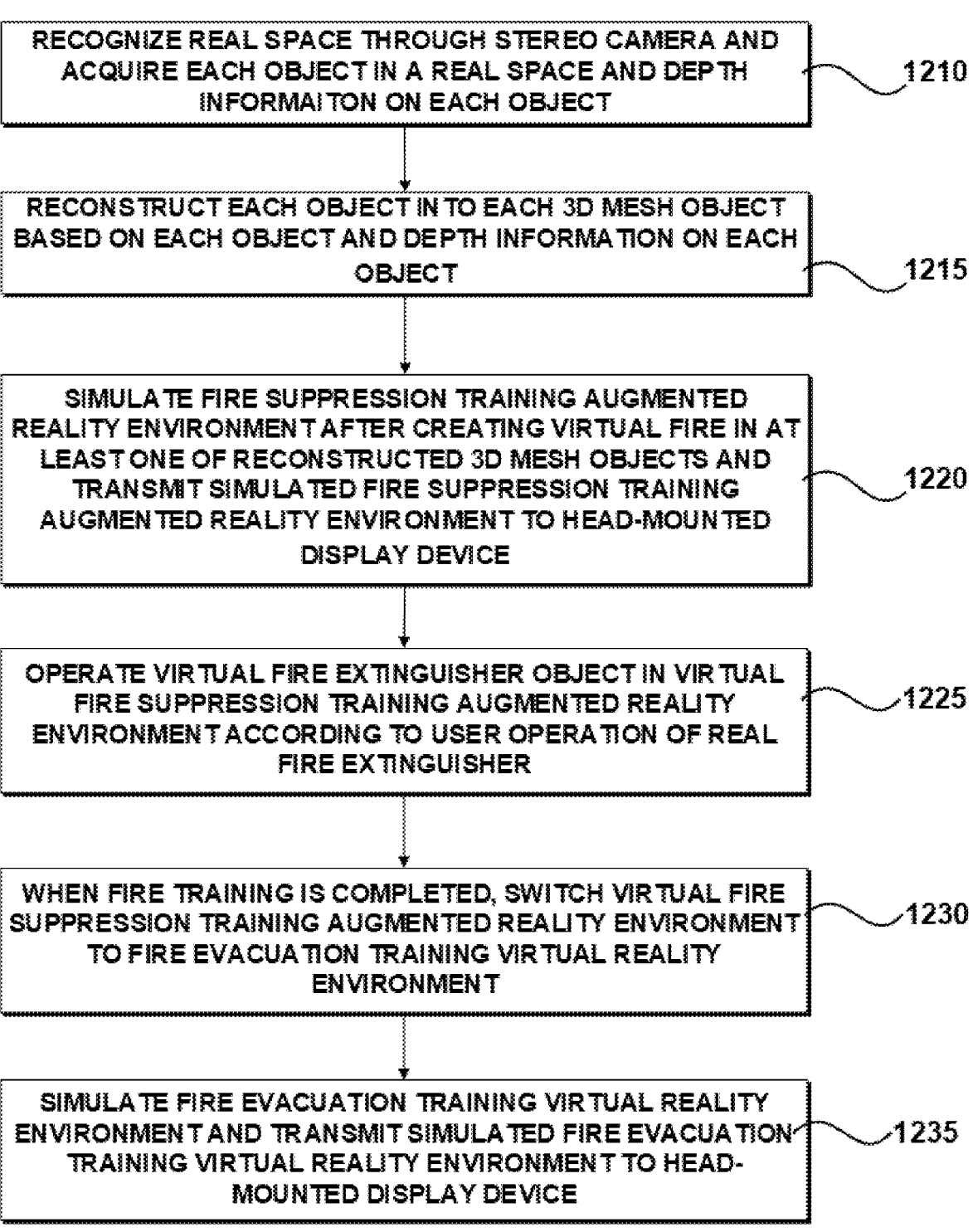

RECOGNIZE REAL SPACE THROUGH STEREO CAMERA AND ACQUIRE EACH OBJECT IN A REAL SPACE AND DEPTH INFORMAITON ON EACH OBJECT — 1210

RECONSTRUCT EACH OBJECT IN TO EACH 3D MESH OBJECT BASED ON EACH OBJECT AND DEPTH INFORMATION ON EACH OBJECT — 1215

SIMULATE FIRE SUPPRESSION TRAINING AUGMENTED REALITY ENVIRONMENT AFTER CREATING VIRTUAL FIRE IN AT LEAST ONE OF RECONSTRUCTED 3D MESH OBJECTS AND TRANSMIT SIMULATED FIRE SUPPRESSION TRAINING AUGMENTED REALITY ENVIRONMENT TO HEAD-MOUNTED DISPLAY DEVICE — 1220

OPERATE VIRTUAL FIRE EXTINGUISHER OBJECT IN VIRTUAL FIRE SUPPRESSION TRAINING AUGMENTED REALITY ENVIRONMENT ACCORDING TO USER OPERATION OF REAL FIRE EXTINGUISHER — 1225

WHEN FIRE TRAINING IS COMPLETED, SWITCH VIRTUAL FIRE SUPPRESSION TRAINING AUGMENTED REALITY ENVIRONMENT TO FIRE EVACUATION TRAINING VIRTUAL REALITY ENVIRONMENT — 1230

SIMULATE FIRE EVACUATION TRAINING VIRTUAL REALITY ENVIRONMENT AND TRANSMIT SIMULATED FIRE EVACUATION TRAINING VIRTUAL REALITY ENVIRONMENT TO HEAD-MOUNTED DISPLAY DEVICE — 1235

EXTENDED REALITY-BASED FIRE TRAINING METHOD AND APPARATUS

CROSS-REFERENCE TO RELATED APPLICATION

This application claims priority under 35 U.S.C. § 119(a) to Korean Patent Application No. 10-2022-0131521 filed on Oct. 13, 2022, the entire contents of which are incorporated herein by reference.

BACKGROUND

(a) Technical Field

The present disclosure relates to an extended reality-based fire training method and apparatus.

(b) Background Art

Extended reality is a technology that can operate as a single world without a boundary between real world and virtual world. This extended reality technology may be applied to almost all fields such as entertainment, advertising, education, training, and treatment. In particular, studies applying the extended reality to the education and training are increasing. Grzegorz Zwolinski et al. generated various cases of different extended reality training application programs and tested these programs to identify pros and cons of each approach in an educational context, and suggested a direction to generate an effective extended reality training tool. Jamie K. Pringle et al. generated and tested an extended reality virtual learning tool in relation to geophysics, and as a result, suggested that the training tool using the extended reality is more efficient than the existing training tool.

The training using the extended reality has been applied and studied in various fields. Dong Keon Lee et al. devised an extended reality training system for basic life support. This system is a training system in which a participant wears an extended reality HMD and performs chest compressions and artificial respiration on a real doll to rescue a virtual emergency patient. Yong Guk Go et al. proposed a training system for a first-person view drone in an extended reality environment. By allowing users of virtual reality to train users to fly using mixed reality, training that is difficult to actually experience was solved using extended reality technology. One of the difficult aspects of implementing an extended reality education and training system is the problem of actual manipulation of the physical device included in the control interface. Ariel Caputo et al.'s XR-Cockpit system proposed a model airplane piloting training simulation using hand tracking technology and gesture recognition technology. However, in the above study, it is difficult to transmit tactile feedback because a virtual interface in the air needs to be manipulated.

The above information disclosed in this Background section is only for enhancement of understanding of the background of the invention and therefore it may contain information that does not form the prior art that is already known in this country to a person of ordinary skill in the art.

SUMMARY

The present disclosure provides an extended reality-based fire training method and system.

In addition, the present disclosure provides an extended reality-based fire training method and system that can provide augmented reality and virtual reality through a single head-mounted display device.

In addition, the present disclosure is an extended reality-based fire training method and system that enables realistic fire suppression training based on augmented reality through interlocking with a real fire extinguisher, and enables safe fire evacuation training based on virtual reality.

According to an aspect of the present disclosure, an extended reality-based fire training method is provided.

According to an embodiment of the present disclosure, the extended reality-based fire training method may include: (a) acquiring each object in a real space acquired through a stereo camera and depth information on each object; (b) reconstructing each object into a 3D mesh object based on each object and the depth information on each object; (c) simulating a virtual fire suppression training augmented reality environment after generating a virtual fire in at least one of the reconstructed 3D mesh objects, and transmitting the simulated virtual fire suppression training augmented reality environment to a head-mounted display device; and (d) operating a virtual fire extinguisher object in a virtual fire suppression training augmented reality environment according to a user manipulation of a real fire extinguisher, and extinguishing a virtual fire object by firing a virtual powder object toward the virtual fire object according to the operation of the virtual fire extinguisher object.

The virtual fire object may be generated with different sizes and effects according to a size and material of the reconstructed 3D mesh object to be a fire target, and the effect may be at least one of a color of smoke, a duration time of the virtual fire object, and a rate at which the virtual fire object increases.

A particle effect of a unity engine may be applied to the virtual powder object and the virtual fire object, and in the extinguishing, when the virtual powder object may collide with particles of the virtual fire object, the size of the virtual fire object may be implemented to be reduced, and when the size of the virtual fire object is 0 or less, the virtual fire object may be extinguished.

The extended reality-based fire training method may further include: switching the virtual fire suppression training augmented reality environment to a fire evacuation virtual reality environment, simulating a fire evacuation training virtual reality environment and transmitting the simulated fire evacuation training virtual reality environment to the head-mounted display device; and moving a virtual avatar in the fire evacuation training virtual environment based on a change in positions of a plurality of trackers worn by a user.

In the switching from the virtual fire suppression training augmented reality environment to the fire evacuation virtual reality environment, an environment switching object for switching between the virtual fire suppression training augmented reality environment and the fire evacuation virtual reality environment may be provided in the virtual fire suppression training augmented reality environment or the fire evacuation virtual reality environment, and the environment switching object may be implemented using a virtual portal.

A height of an evacuation posture of the virtual avatar may be determined when evacuating a fire according to a height of the head-mounted display device worn by the user, and a head tracking function of the head-mounted display device may be activated when switching to the fire evacuation virtual reality environment.

According to another aspect of the present disclosure, an extended reality-based fire training apparatus is provided.

According to another embodiment of the present disclosure, an extended reality-based fire training apparatus may include: a stereo camera configured to recognize real space and acquire each object in the real space and depth information on each object; a reconstruction unit configured to reconstruct each object into a 3D mesh object based on each object and the depth information on each object; a fire training simulation unit configured to simulate a virtual fire suppression training augmented reality environment after generating a virtual fire in at least one of the reconstructed 3D mesh objects, and transmit the simulated virtual fire suppression training augmented reality environment to a head-mounted display device; and a synchronization unit configured to synchronize a virtual fire extinguisher object in interlocking with a real fire extinguisher based on information acquired from a plurality of sensors attached to a real fire extinguisher, in which the fire training simulation unit may operate a virtual fire extinguisher object in a virtual fire suppression training augmented reality environment according to a user manipulation of a real fire extinguisher, and extinguish a virtual fire object by firing a virtual powder object toward the virtual fire object according to the operation of the virtual fire extinguisher object.

A particle effect of a unity engine may be applied to the virtual powder object and the virtual fire object, and the fire training simulation unit may generate the virtual fire object with a predetermined size value, and implement the virtual fire object to increase as a size value of the virtual fire object increases with the passage of time, and reduce the size of the virtual fire object when the virtual powder object collides with a particle of the virtual fire object, and implement the virtual fire object to be extinguished when the size value of the virtual fire object is 0 or less.

The extended reality-based fire training apparatus may further include: a processor configured to switch the virtual fire suppression training augmented reality environment to a fire evacuation virtual reality environment when fire training is completed, the processor activating a plurality of trackers worn by the user; and an evacuation training simulation unit configured to simulate a fire evacuation training virtual reality environment and transmits the simulated fire evacuation training virtual reality environment to the head-mounted display device, in which the evacuation training simulation unit may move a virtual avatar in the fire evacuation training virtual environment based on a change in positions of the plurality of trackers worn by the user.

The processor may control an environment switching object for switching between the virtual fire suppression training augmented reality environment and the fire evacuation training virtual reality environment to be output to one area of the virtual fire suppression training augmented reality environment or the fire evacuation training virtual reality environment, and the environment switching object may be implemented using a virtual portal.

The evacuation training simulation unit may determine a height of an evacuation posture of the virtual avatar when evacuating a fire according to a height of the head-mounted display device worn by the user, and activate a head tracking function of the head-mounted display device when switching to the fire evacuation virtual reality environment.

The evacuation training simulation unit may determine that evacuation training has failed when the user moves the virtual avatar to a fire occurrence location, the evacuation posture of the virtual avatar moves for more than a reference time while the height of the virtual avatar is greater than or equal to a reference value, or a virtual handkerchief object moves for more than the reference time while the virtual handkerchief object is not located on a part of a face of the virtual avatar, and terminates an evacuation training simulation.

The effects of the present disclosure are not limited to the aforementioned effect, and other effects not mentioned above will be clearly understood to those skilled in the art from the description of the appended claims.

BRIEF DESCRIPTION OF THE DRAWINGS

FIG. 12 is a flowchart illustrating an extended reality-based fire training method according to an embodiment of the present disclosure.

DETAILED DESCRIPTION

In the present specification, singular forms include plural forms unless the context clearly indicates otherwise. In the specification, it is to be noted that the terms "comprising" or "including', and the like, are not be construed as necessarily including several components or several steps described in the specification and some of the above components or steps may not be included or additional components or steps are construed as being further included. In addition, terms "-er/or", "module", and the like, described in the specification refer to a processing unit of at least one function or operation and may be implemented by hardware or software or a combination of hardware and software.

Hereinafter, exemplary embodiments of the present disclosure will be described in detail with reference to the accompanying drawings.

Figure 1:
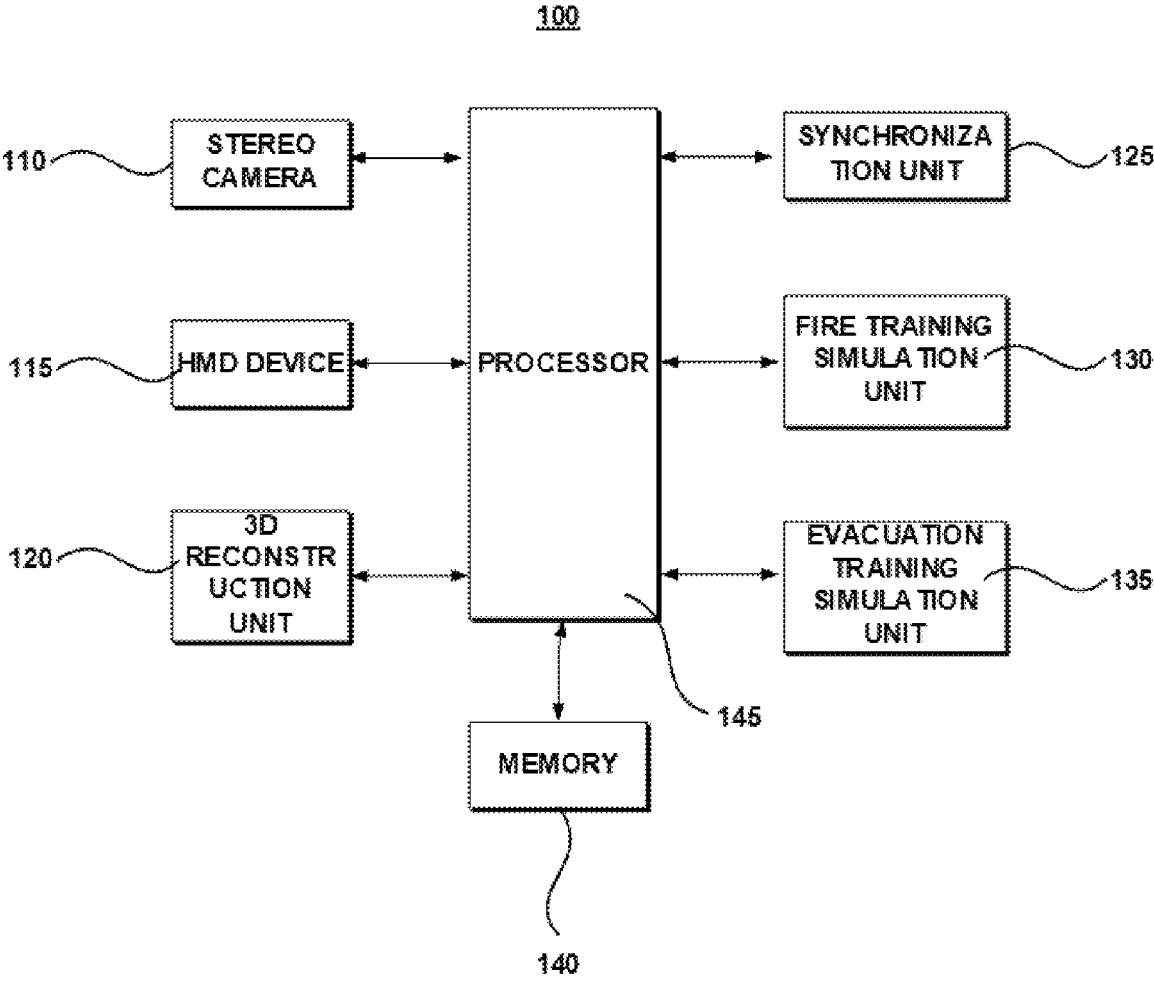
FIG. 1 is a block diagram schematically illustrating an internal configuration of an extended reality-based fire training apparatus according to an embodiment of the present disclosure.
Figure 2:
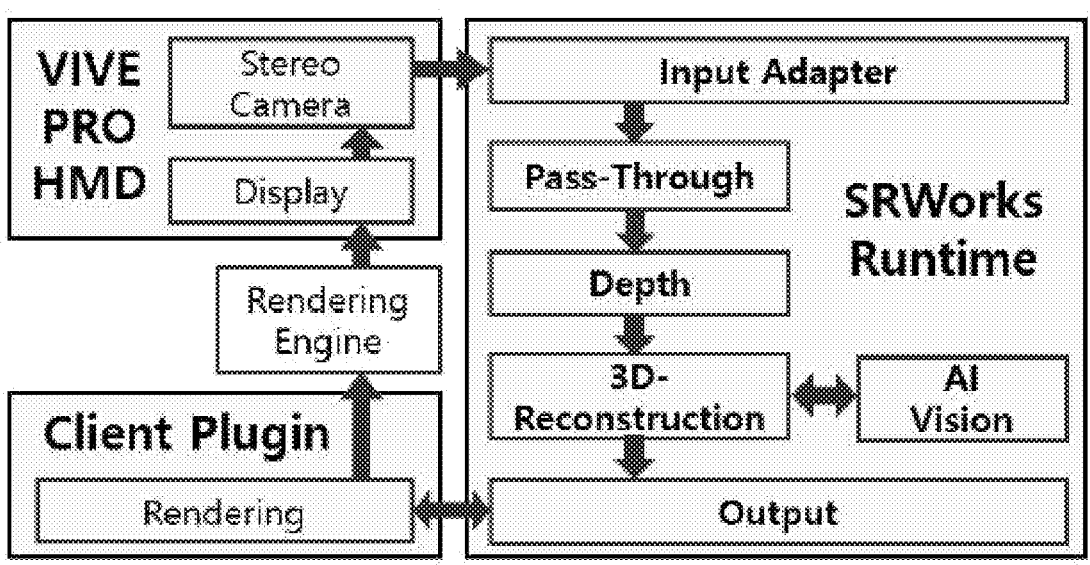
FIG. 2 is a diagram illustrating an example of an SRWorks library module according to an embodiment of the present disclosure.
Figure 3:
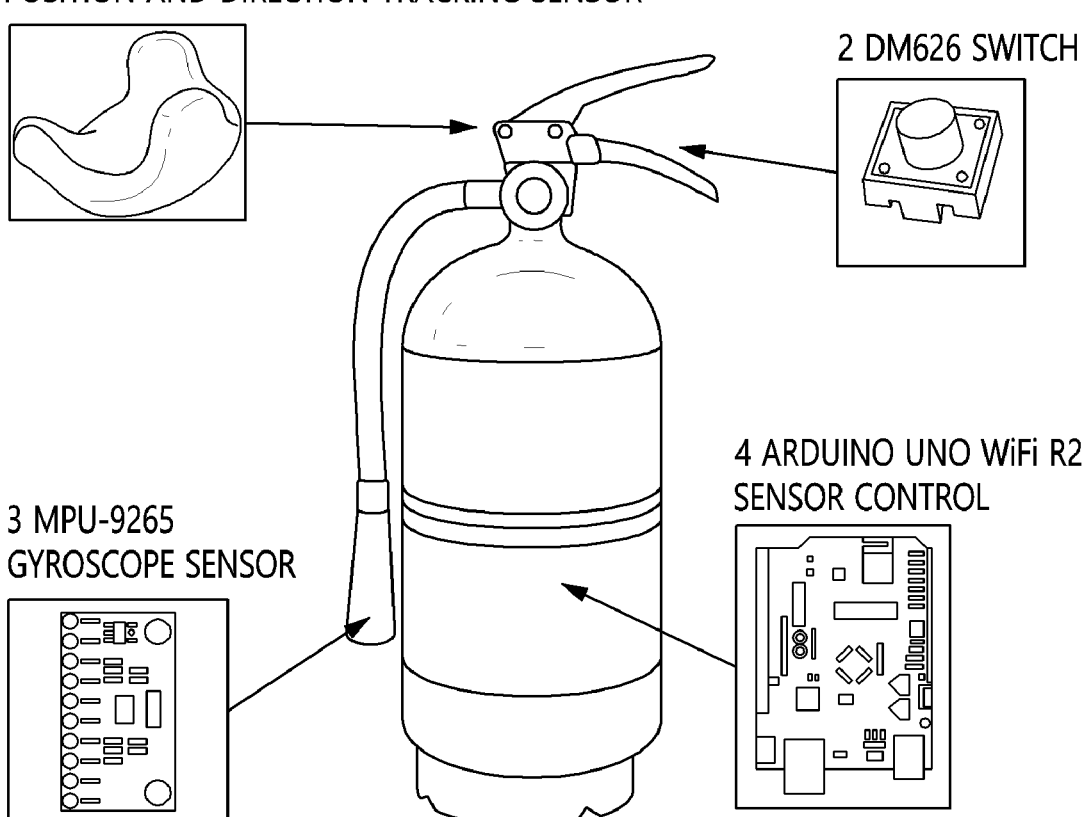
FIG. 3 is a diagram illustrating an example of a prototype of a real fire extinguisher according to an embodiment of the present disclosure.
Figure 4:
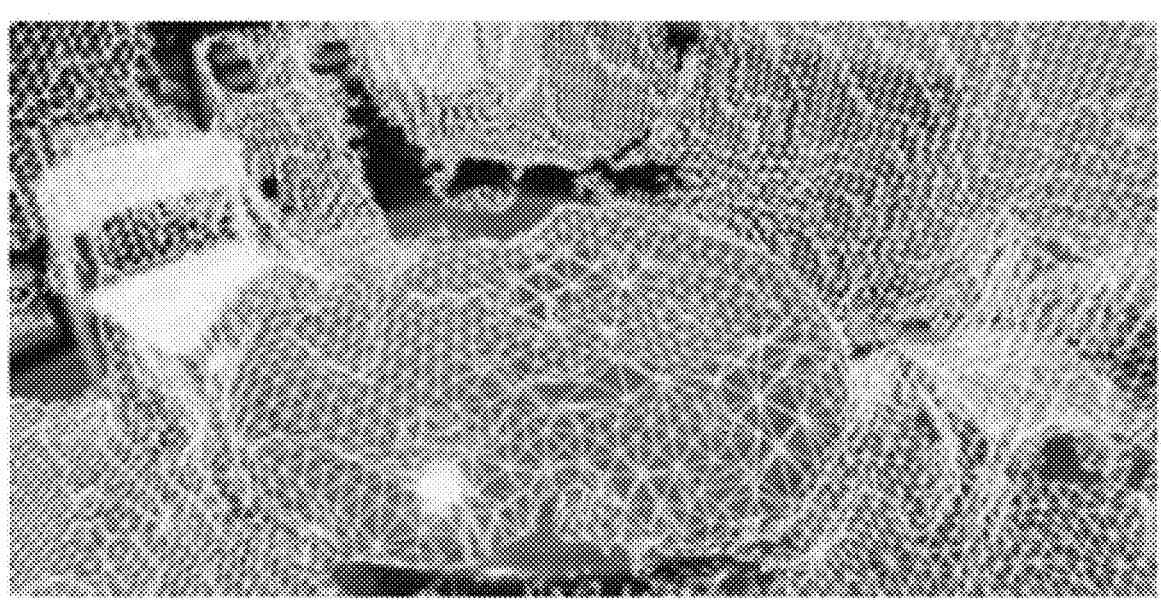
FIG. 4 is a diagram illustrating an example of reconstructing an object in a real space into a 3D mesh object according to an embodiment of the present disclosure.
Figure 5:
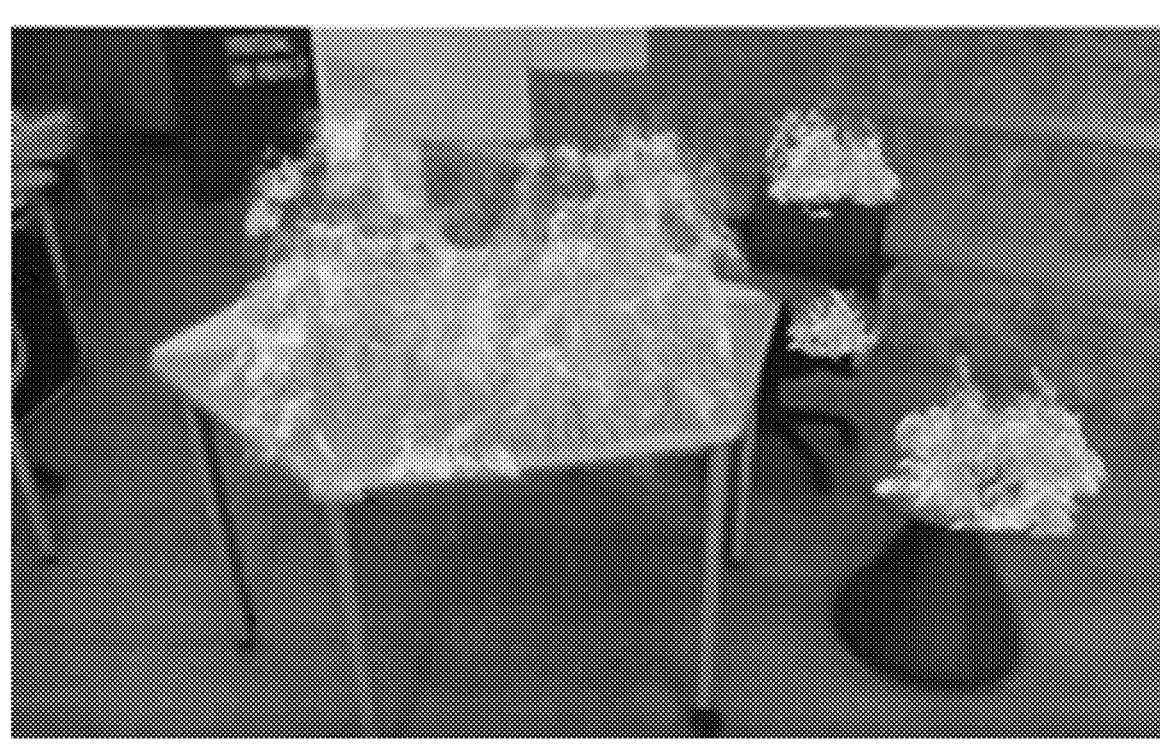
FIG. 5 is a diagram for describing a creation of a virtual fire object according to an embodiment of the present disclosure.
Figure 6:
FIG. 6 is a diagram illustrating a situation of suppressing a virtual fire in a virtual fire suppression training augmented reality environment according to an embodiment of the present disclosure.
Figure 7:
FIG. 7 is a diagram for training fire training according to an embodiment of the present disclosure.
Figure 8:
FIG. 8 is a diagram illustrating an evacuation training virtual reality environment according to an embodiment of the present disclosure.
Figure 9:
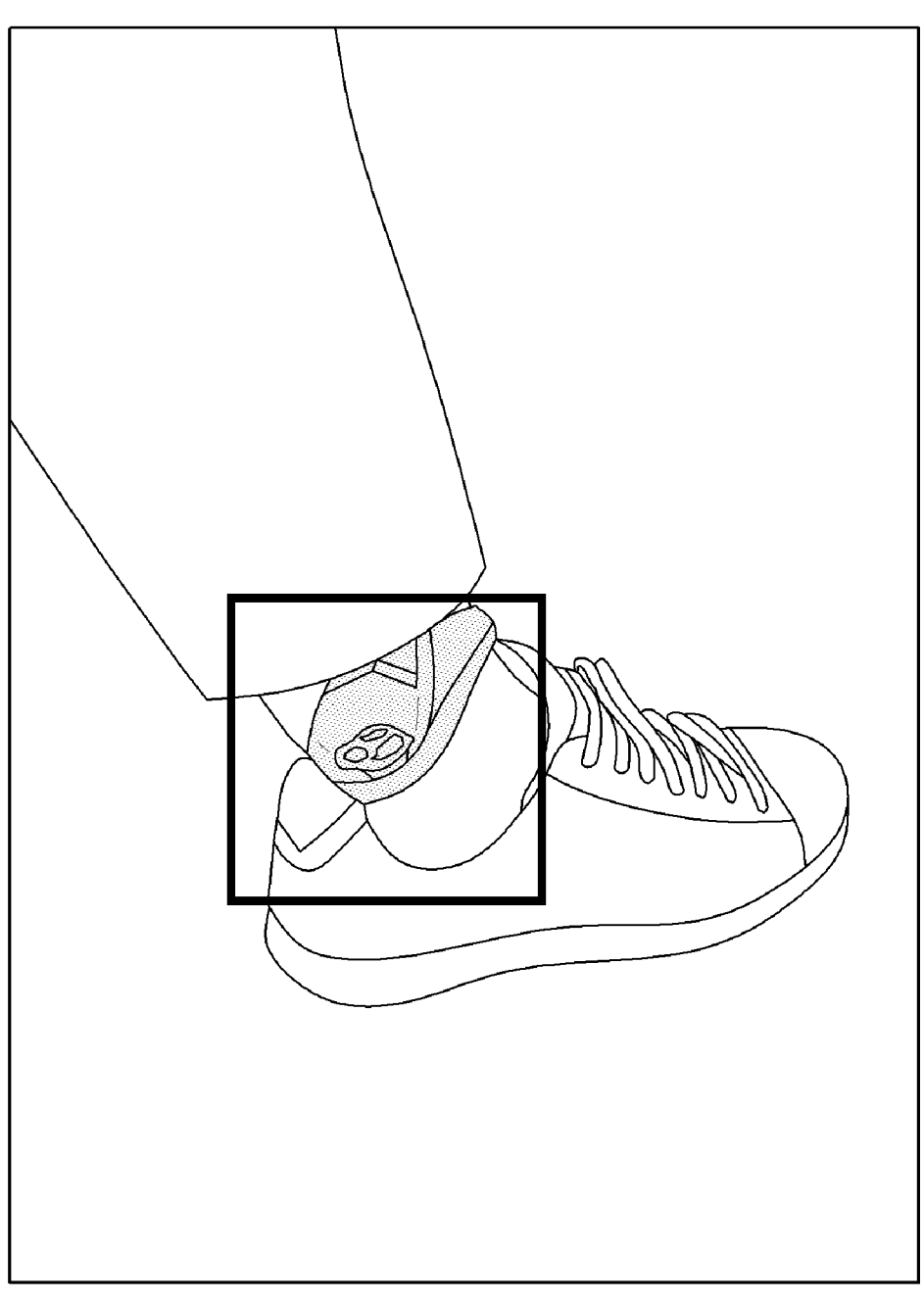
FIG. 9 is a view illustrating an example of attaching a tracker to a part of a body according to an embodiment of the present disclosure.
Figure 10:
FIG. 10 is a diagram for describing an environment switching object for switching to a virtual reality environment in a virtual fire suppression training augmented reality environment according to an embodiment of the present disclosure.
Figure 11:
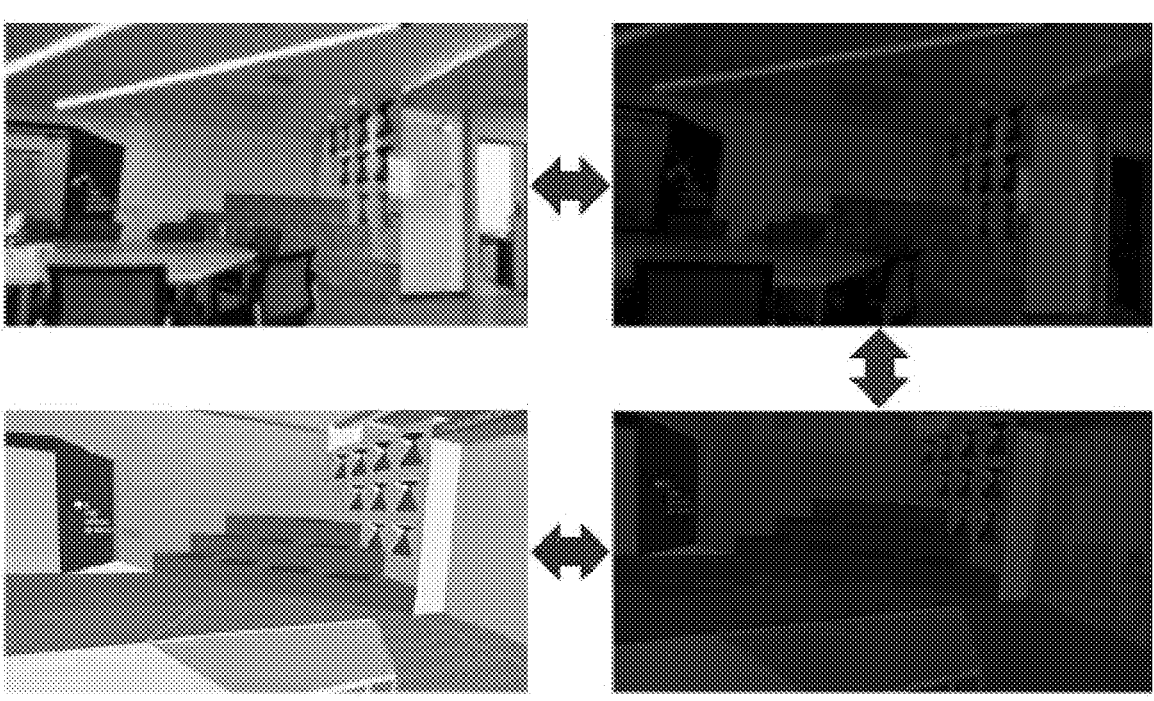
FIG. 11 is a diagram for describing an environment switching object for switching to a virtual reality environment in a virtual fire suppression training augmented reality environment according to another embodiment of the present disclosure.

FIG. 1 is a block diagram schematically illustrating an internal configuration of an extended reality-based fire training apparatus according to an embodiment of the present disclosure, FIG. 2 is a diagram illustrating an example of an SRWorks library module according to an embodiment of the present disclosure, FIG. 3 is a diagram illustrating an example of a prototype of a real fire extinguisher according to an embodiment of the present disclosure, FIG. 4 is a diagram illustrating an example of reconstructing an object in a real space into a 3D mesh object according to an embodiment of the present disclosure, FIG. 5 is a diagram for describing a creation of a virtual fire object according to an embodiment of the present disclosure, FIG. 6 is a diagram illustrating a situation of suppressing a virtual fire in a virtual fire suppression training augmented reality environment according to an embodiment of the present disclosure, FIG. 7 is a diagram for training fire training according to an embodiment of the present disclosure, FIG. 8 is a diagram illustrating an evacuation training virtual reality environment according to an embodiment of the present disclosure, FIG. 9 is a view illustrating an example of attaching a tracker to a part of a body according to an embodiment of the present disclosure, FIG. 10 is a diagram for describing an environment switching object for switching to a virtual reality environment in a virtual fire suppression training augmented reality environment according to an embodiment of the present disclosure, and FIG. 11 is a diagram for describing an environment switching object for switching to a virtual reality environment in a virtual fire suppression training augmented reality environment according to another embodiment of the present disclosure.

Referring to FIG. 1, an extended reality-based fire training apparatus 100 according to an embodiment of the present disclosure is configured to include a stereo camera 110, a head-mounted display (HMD) device 115, a three-dimensional (3D) reconstruction unit 120, and a synchronization unit 125, a fire training simulation unit 130, an evacuation training simulation unit 135, a memory 140, and a processor 145.

The stereo camera 110 is a means for recognizing a real space and acquiring each object in the real space and depth information on each object.

The stereo camera 110 is a means for acquiring a preview or a captured image of a real space.

In one embodiment of the present disclosure, it is assumed that the stereo camera 110 is provided in a configuration separate from the head-mounted display device 115, but the stereo camera 110 may be one configuration of the head-mounted display device 115.

The stereo camera 110 according to an embodiment of the present disclosure may provide an image of an actual space to the head-mounted display device 115. In addition, the stereo camera 110 may recognize an object in a real space (i.e., real world) and also detect depth information on the object.

In order to recognize an object existing in the real world, the stereo camera 110 may be provided with a deep learning vision module. Through the deep learning vision module, the stereo camera 110 may recognize each object in the real world and acquire the depth information on the recognized object together.

The head-mounted display device 115 is a display device that may be mounted on a head to directly present an image in front of user's eyes.

The head-mounted display device 115 may implement and display augmented reality or virtual reality in interlocking with the real world.

In one embodiment of the present disclosure, it is assumed that the head-mounted display device 115 is a virtual reality headset, for example a VIVE PRO model, which will be mainly described below, but it is natural that the same may be applied to other head-mounted display devices 115.

As such, by using the virtual reality headset such as the VIVE PRO model, a fire training apparatus according to an embodiment of the present disclosure has the advantage of being able to display both the augmented reality environment and the virtual reality environment through one head-mounted display device 115.

The SRWorks SDK (Software Development Kit) distributed by the VIVE developer was used for interlocking with the stereo camera 110 to experience both the augmented reality and virtual reality through the head-mounted display device 115 of the VIVE PRO model.

Since the function and operation of the head-mounted display device 115 of the VIVE PRO model are obvious to those skilled in the art, a separate description thereof will be omitted.

The 3D reconstruction unit 120 is a means for reconstructing a real space image acquired through the stereo camera 110 into 3D.

As described above, each object and depth information on each object may be acquired from a real space image acquired through the stereo camera 110. Accordingly, the 3D reconstruction unit 120 may reconstruct the objects in the real space into the 3D in consideration of the depth information on each object. In order to reconstruct the objects in this real space into 3D, the SRWorks SDK distributed by VIVE developer was used. An example of SRWorks library module is illustrated in FIG. 2.

When a pre-trained object is recognized from a real space image of 2D pixels acquired through the stereo camera 110, the 3D reconstruction unit 120 may specify a label of the object, and reconstruct the objects into a 3D mesh based on the depth information and independently split the objects.

Here, the trained object may be, for example, a chair, a desk, a monitor, a door, a floor, a ceiling, a human, and the like.

The synchronization unit 125 is a means for synchronizing the real fire extinguisher and the virtual fire extinguisher.

The real fire extinguisher may be provided with a plurality of sensors. For example, the sensor attached to the real fire extinguisher may be a position tracking sensor, an acceleration sensor, a switch, and the like.

FIG. 3 illustrates a prototype of the real fire extinguisher. Since the embodiment of the present disclosure is for the purpose of suppressing a virtual fire, water is not injected into the real fire extinguisher. A plurality of sensors may be linked through wired/wireless communication through an Arduino (UNO WiFi R2 Board) sensor controller.

A tracker for tracking the location of the fire extinguisher, for example VIVE Tracker, is mounted on an upper end of the real fire extinguisher, and a gyroscope sensor, for example MPU-9265, may be mounted on a part of a hose for tracking the direction of the hose of the fire extinguisher. In addition, a physical switch, for example DM626 Switch, may be mounted on a handle portion of the real fire extinguisher.

That is, the positional information of the fire extinguisher is acquired through the tracker mounted on the upper end of the fire extinguisher, and the synchronization unit 125 may synchronize the location with the virtual fire extinguisher using the corresponding location information of the fire extinguisher.

In addition, the synchronization unit 125 may acquire the operation direction information of the fire extinguisher hose by using a gyroscope sensor mounted on the hose part of the fire extinguisher. The synchronization unit 125 may determine the direction of the fire hose from which the virtual powder of the virtual fire extinguisher is ejected based on the operation direction information of the fire extinguisher hose.

In addition, the synchronization unit 125 may acquire information on the handle operation of the fire extinguisher by using a physical switch attached to the handle portion of the fire extinguisher, and may synchronize the virtual powder object to be fired from the virtual fire extinguisher. The virtual powder object ejected (fired) from the virtual fire extinguisher may be implemented using a particle effect of a unity engine.

For example, a virtual fire extinguisher 3D model was implemented using a fire extinguisher for a fire extinguisher 3D model in the unity engine.

The synchronization unit 125 synchronizes the real fire extinguisher with the virtual fire extinguisher 3D model in interlocking with the position, direction, and hose direction of the real fire extinguisher. The hose has a hierarchical structure, and when an end portion of the hose is moved using the direction information of the gyroscope sensor, the hose may be implemented to be bent naturally.

The fire training simulation unit 130 is a means for simulating a virtual fire suppression training augmented reality environment. The fire training simulation unit 130 may simulate the virtual fire suppression training augmented reality environment and output the virtual fire suppression training augmented reality environment through the head-mounted display device 115.

This will be described below in more detail.

The fire training simulation unit 130 generates a virtual fire object from at least one of the 3D mesh objects reconstructed in the virtual fire suppression training augmented reality environment. The virtual fire object may be generated with different sizes and effect depending on the size or material of the target object (i.e., the 3D mesh object in which fire is generated). In addition, the virtual fire object may be generated in different sizes depending on the material of the target object (i.e., the 3D mesh object in which the fire is generated). Here, the effect (or attribute) may include at least one of colors (e.g., white or black) of smoke, a duration of the virtual fire object, and a rate at which the virtual fire object increases.

As described above, the generated virtual fire object may be generated with an arbitrary size value, and the virtual fire object may be implemented to increase by increasing the size value of the virtual fire object as time elapses.

For example, this will be described in detail with reference to FIGS. 4 and 5.

As illustrated in FIG. 4, when the real space is recognized by the stereo camera 110, at least one object in the recognized real space may be reconstructed into 3D and stored as the 3D mesh object.

Subsequently, as illustrated in FIG. 5, the virtual fire object may be implemented to be generated from at least one of the corresponding 3D mesh objects. It goes without saying that the real space recognized by the stereo camera 110 may vary according to movement of a user's head that is equipped with the head-mounted display device 115, and the objects recognized within the corresponding real space may also vary.

As described above, a method of performing virtual fire training after generating the virtual fire object from at least one of the 3D mesh objects reconstructed in the virtual fire suppression training augmented reality environment will be described.

As described above, the real fire extinguisher and the virtual fire extinguisher operating in the virtual fire suppression training augmented reality environment are synchronized by the synchronization unit 125.

Therefore, as the user operates the real fire extinguisher, the fire training simulation unit 130 renders the virtual fire extinguisher in the virtual fire suppression training augmented reality environment, but may synchronize the virtual fire extinguisher according to the operation of the real fire extinguisher acquired by the synchronization unit 125.

For example, when the user lifts and moves the real fire extinguisher, positions the hose toward the virtual fire object, and then presses the physical switch attached to the handle of the real fire extinguisher, the virtual fire extinguisher may be synchronized in the virtual fire suppression training augmented reality environment, and thus, implemented to fire the virtual powder object towards the virtual fire object. Here, the particle effect of the unity engine may be applied to the virtual powder object.

When the corresponding virtual powder object is fired, the virtual fire extinguisher may be implemented to extinguish the virtual fire object while the particles of the virtual powder object collide with the particles of the virtual fire object. That is, while the particles of the virtual powder object collide with the particles of the virtual fire object, the size value of the virtual fire object decreases, and when the corresponding size value becomes 0, the virtual fire object may be simulated to disappear.

FIG. 6 is a diagram illustrating the situation in which the virtual fire is suppressed in the virtual fire suppression training augmented reality environment. After the virtual fire object is checked, when a safety pin of the real fire extinguisher is pulled out, the hose is posited to direct to the virtual fire object, and then the switch of the real fire extinguisher is pressed, as illustrated in FIG. 6, the virtual powder object will be fired toward the virtual fire object. When the virtual fire object is not completely reduced, if residual fire of the virtual fire object remains, the virtual fire extinguisher may be implemented so that the virtual fire object becomes larger again as time passes.

In order to completely extinguish the virtual fire object in the virtual fire suppression training augmented reality environment, by implementing the same action as suppressing a fire using the real fire extinguisher, it is possible to perform safe and immersive fire training. That is, in the case of the real fire extinguishing training, smell or heat may be felt directly, and therefore, a sense of urgency may be created, but it is very dangerous. In the case of the actual fire training, fire training is possible only in limited situations, such as lighting a fire inside a building. However, by performing the fire training through the virtual fire suppression training augmented reality environment, there is an advantage in that the fire training may be safely performed regardless of location.

In addition, there is a disadvantage in that the conventional fire training in the virtual environment is mostly performed through input devices (controller, mouse, etc.) other than the real fire extinguisher, or is made only with visual images and images. However, in the case of the virtual fire suppression training augmented reality environment according to the embodiment of the present disclosure, there is an advantage of realizing high immersion by using the real fire extinguisher.

FIG. 7 illustrates an example of a fire suppression training scenario. As illustrated in FIG. 7, when the user operates the real fire extinguisher while wearing the head-mounted display device 115, the fire training may be performed through the synchronized virtual fire extinguisher in the virtual fire suppression training augmented reality environment.

The evacuation training simulation unit 135 simulates the evacuation training virtual reality environment and transmits the simulated evacuation training virtual reality environment to the head-mounted display device 115. The simulated evacuation training virtual reality environment is as illustrated in FIG. 8.

The evacuation training may be implemented with three actions. For example, the action of touching a handkerchief object to the face may be performed. In real situations, when a nose and a mouth are not covered with a handkerchief, clothes, or the like, problems with inhaling carbon monoxide and toxic gases may cause catastrophic consequences.

Accordingly, according to an embodiment of the present disclosure, the virtual handkerchief object may interlock with the tracker. When the user positions the tracker interlocking with the virtual handkerchief object near his/her mouth, it may be determined that the virtual handkerchief object covers the nose and mouth.

The evacuation training simulation unit 135 may terminate the training and output a warning phrase when the evacuation proceeds for more than 30 seconds cumulatively without touching the virtual handkerchief object to the face during the evacuation training in the evacuation training virtual reality environment.

In addition, the evacuation training simulation unit 135 may determine whether the user moves to a posture lower than or equal to a reference value by tracking the position of the head-mounted display device 115. For example, as a result of tracking the position of the head-mounted display device 115, the evacuation training simulation unit 135 may terminate the evacuation training when a user moves for more than 30 seconds cumulatively without lowering a face height within about 1 m 30 cm height and output a warning message.

In addition, the evacuation training simulation unit 135 may implement the movement of the user based on information acquired through a plurality of trackers worn by the user on both feet. That is, the user may attach two trackers to ankles of both feet (see FIG. 9). The direction in which the user moves may be determined as a front direction viewed by the head-mounted display device 115. The evacuation movement may be activated when the virtual evacuation training starts after the fire suppression training is terminated.

That is, the evacuation training simulation unit 135 may move the virtual avatar in the evacuation training virtual reality environment by using the difference in position between the trackers attached to the ankles of both feet when walking in place while the trackers are attached to the ankles of both feet. That is, the evacuation training simulation unit 135 may determine that the evacuation training has passed when the virtual avatar moves to an outside of a building where a fire occurred. When a virtual handkerchief does not cover a nose and a mouth or moving over a time limit with the head raised, the evacuation training simulation unit 135 may determine that the evacuation training has failed and may be terminated.

Of course, the evacuation training simulation unit 135 may determine that the evacuation training has failed and immediately stop the evacuation training when the user determines the evacuation direction incorrectly and moves to the location where the virtual fire occurs.

The memory 140 stores instructions for performing the extended reality-based fire training method according to an embodiment of the present disclosure.

The processor 145 is means for controlling internal components (e.g., the stereo camera 110, the head-mounted display device 115, and the 3D reconstruction unit 120, the synchronization unit 125, the fire training simulation unit 130, the evacuation training simulation unit 135, the memory 140, etc.) of the extended reality-based fire training apparatus 100 according to the embodiment of the present disclosure.

In addition, when the virtual fire suppression training is completed, the processor 145 may control the augmented reality environment and the virtual reality environment to be switched. That is, when the virtual fire suppression training is terminated, the processor 145 may control the environment switching object for switching to the virtual reality environment in the virtual fire suppression training augmented reality environment to be output. For example, the environment switching object may be implemented using a virtual portal, and the form of the environment switching object may be a virtual door object. Of course, it goes without saying that the switching object may be implemented in a form other than the virtual door object.

FIG. 10 illustrates an example of an environment switching object.

Also, as illustrated in FIG. 11, the processor 145 may switch from the augmented reality environment to the virtual reality environment by applying a fade-in/fade-out technique.

In addition, the processor 145 may activate the plurality of trackers worn by the user when switching from the augmented reality environment to the virtual reality environment.

FIG. 12 is a flowchart illustrating an extended reality-based fire training method according to an embodiment of the present disclosure.

In step 1210, the extended reality-based fire training apparatus 100 recognizes a real space through a stereo camera, and acquires each object in the real space and depth information on each object.

In step 1215, the extended reality-based fire training apparatus 100 reconstructs each object into 3D mesh objects, respectively, based on each object and the depth information on each object.

In step 1220, the extended reality-based fire training apparatus 100 generates a virtual fire object in at least one of the reconstructed 3D mesh objects, and then simulates the virtual fire suppression training augmented reality environment and transmits the simulated virtual fire suppression training augmented reality environment to the head-mounted display device.

In step 1225, the extended reality-based fire training apparatus 100 operates the virtual fire extinguisher object in the virtual fire suppression training augmented reality environment according to the user manipulation of the real fire extinguisher.

It is assumed that the real fire extinguisher and the virtual fire extinguisher object are synchronized with each other.

That is, it can be implemented so that the virtual fire extinguisher object is synchronized and operates according to information (position, direction, and switch on/off)

acquired from a plurality of sensors attached to the real fire extinguisher. As the user operates the real fire extinguisher, the virtual fire extinguisher object operates based on the information acquired from the plurality of sensors attached to the real fire extinguisher, but the virtual powder object is fired toward the virtual fire object according to the operation of the virtual fire extinguisher object and the fire extinguishing operation may proceed.

Since this is the same as described above, a detailed description thereof will be omitted.

In step 1230, the extended reality-based fire training apparatus 100 switches the virtual fire suppression training augmented reality environment into the fire evacuation training virtual reality environment when the fire training is completed.

In this case, the extended reality-based fire training apparatus 100 may output the environment switching object for switching between the virtual fire suppression training augmented reality environment and the fire evacuation training virtual reality environment to one area of the virtual fire suppression training augmented reality environment or the fire evacuation training virtual reality environment. Here, the environment switching object is implemented using the virtual portal.

In addition, the extended reality-based fire training apparatus may activate a plurality of trackers worn on a part of a user's body according to the switching from the corresponding virtual fire suppression training augmented reality environment to the fire evacuation training virtual reality environment.

In addition, the extended reality-based fire training apparatus may output a virtual avatar according to the switching from the corresponding virtual fire suppression training augmented reality environment to the fire evacuation training virtual reality environment.

In step 1235, the extended reality-based fire training apparatus 100 simulates the fire evacuation training virtual reality environment and transmits the simulated fire evacuation training virtual reality environment to the head-mounted display device.

The extended reality-based fire training apparatus 100 may move the virtual avatar on the fire evacuation training virtual environment based on the change in positions of the plurality of trackers worn by the user. In addition, the extended reality-based fire training apparatus 100 may determine the height of the evacuation posture of the virtual avatar when evacuating a fire according to the height of the head-mounted display device worn by the user.

In this case, as described above, the head-mounted display device 115 may be activated when switching to the fire evacuation training virtual reality environment, and may be deactivated in the virtual fire suppression training augmented reality environment.

The extended reality-based fire training apparatus 100 the evacuation training simulation unit may determine that evacuation training has failed when the user moves the virtual avatar to the fire occurrence location, the virtual avatar moves for more than a reference time while the height of the evacuation posture of the virtual avatar is greater than or equal to a reference value, or a virtual handkerchief object moves for more than the reference time while the virtual handkerchief object is not located on a part of a face of the virtual avatar, and may terminate the evacuation training simulation.

The apparatus and the method according to an exemplary embodiment of the present disclosure may be implemented in a form of program commands that may be executed through various computer means and may be recorded in a computer-readable recording medium. The computer-readable recording medium may include a program command, a data file, a data structure, or the like, alone or a combination thereof. The program commands recorded in the computer-readable recording medium may be especially designed and constituted for the present disclosure or be known to those skilled in a field of computer software. Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present disclosure, and vice versa.

By providing an extended reality-based fire training method and system according to an embodiment of the present disclosure, it is possible to provide augmented reality and virtual reality through one head-mounted display device.

In addition, the present disclosure enables realistic fire suppression training based on augmented reality through interlocking with a real fire extinguisher and enables safe fire evacuation training based on virtual reality.

Hereinabove, the present disclosure has been described with reference to exemplary embodiments thereof. It will be understood by those skilled in the art to which the present disclosure pertains that the present disclosure may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

What is claimed is:

1. An extended reality-based fire training method, comprising:
   (a) acquiring each object in a real space acquired through a stereo camera and depth information on each object;
   (b) reconstructing each object into a 3D mesh object based on each object and the depth information on each object;
   (c) simulating a virtual fire suppression training augmented reality environment after generating a virtual fire in at least one of the reconstructed 3D mesh objects, and transmitting the simulated virtual fire suppression training augmented reality environment to a head-mounted display device; and
   (d) operating a virtual fire extinguisher object in a virtual fire suppression training augmented reality environment according to a user manipulation of a real fire extinguisher, and extinguishing a virtual fire object by firing a virtual powder object toward the virtual fire object according to the operation of the virtual fire extinguisher object; and (e) switching the virtual fire suppression training augmented reality environment to a fire evacuation virtual reality environment, simulating a fire evacuation training virtual reality environment and transmitting the simulated fire evacuation training virtual reality environment to the head-mounted display device; and (f) moving a virtual avatar in the fire evacuation training virtual environment based on a change in positions of a plurality of trackers worn by a user, wherein, in the switching from the virtual fire suppression training augmented reality environment to the fire evacuation virtual reality environment, an environment switching object for switching between the virtual fire suppression training augmented reality environment and the fire evacuation virtual reality environment is provided in the virtual fire suppression training augmented reality environment or the fire evacuation training virtual reality environment, and the environment switching object is implemented using a virtual portal.

2. The extended reality-based fire training method of claim 1, wherein the virtual fire object is generated with different sizes and effects according to a size and material of the reconstructed 3D mesh object to be a fire target, and the effect is at least one of a color of smoke, a duration of the virtual fire object, and a rate at which the virtual fire object increases.

3. The extended reality-based fire training method of claim 1, wherein a particle effect of a unity engine is applied to the virtual powder object and the virtual fire object, and wherein, when the virtual powder object collides with particles of the virtual fire object, the size of the virtual fire object is implemented to be reduced, and when the size of the virtual fire object is 0 or less, the virtual fire object is extinguished.

4. The extended reality-based fire training method of claim 1, wherein a height of an evacuation posture of the virtual avatar is determined when evacuating a fire according to a height of the head-mounted display device worn by the user, and a head tracking function of the head-mounted display device is activated when switching to the fire evacuation virtual reality environment.

5. A non-transitory computer-readable recording medium recording program code for performing the method according to claim 1.

6. An extended reality-based fire training apparatus, comprising:

a stereo camera configured to recognize real space and acquire each object in the real space and depth information on each object;

a reconstruction unit configured to reconstruct each object into a 3D mesh object based on each object and the depth information on each object;

a fire training simulation unit configured to simulate a virtual fire suppression training augmented reality environment after generating a virtual fire in at least one of the reconstructed 3D mesh objects, and transmit the simulated virtual fire suppression training augmented reality environment to a head-mounted display device;

a synchronization unit configured to synchronize a virtual fire extinguisher object in interlocking with a real fire extinguisher based on information acquired from a plurality of sensors attached to the real fire extinguisher, a processor configured to switch the virtual fire suppression training augmented reality environment to a fire evacuation virtual reality environment when a fire suppression training is completed, wherein the processor activates a plurality of trackers worn by the user; and an evacuation training simulation unit configured to simulate a fire evacuation training virtual reality environment and transmits the simulated fire evacuation training virtual reality environment to the head-mounted display device, wherein the fire training simulation unit operates the virtual fire extinguisher object in the virtual fire suppression training augmented reality environment according to a user manipulation of the real fire extinguisher, and extinguishes a virtual fire object by firing a virtual powder object toward the virtual fire object according to the operation of the virtual fire extinguisher object, wherein the evacuation training simulation unit moves a virtual avatar in the fire evacuation training virtual reality environment based on a change in positions of the plurality of trackers worn by the user, and wherein the processor controls an environment switching object for switching between the virtual fire suppression training augmented reality environment and the fire evacuation virtual reality environment to be output to one area of the virtual fire suppression training augmented reality environment or the fire evacuation virtual reality environment, and the environment switching object is implemented using a virtual portal.

7. The extended reality-based fire training apparatus of claim 6, wherein the virtual fire object is generated with different sizes and effects according to a size and material of the reconstructed 3D mesh object to be a fire target, and the effect is at least one of a color of smoke, a duration of the virtual fire object, and a rate at which the virtual fire object increases.

8. The extended reality-based fire training apparatus of claim 6, wherein a particle effect of a unity engine is applied to the virtual powder object and the virtual fire object, and the fire training simulation unit generates the virtual fire object with a predetermined size value, and implements the virtual fire object to increase as a size value of the virtual fire object increases with a passage of time, and reduces the size of the virtual fire object when the virtual powder object collides with a particle of the virtual fire object, and implements the virtual fire object to be extinguished when the size value of the virtual fire object is 0 or less.

9. The extended reality-based fire training apparatus of claim 6, wherein the evacuation training simulation unit determines a height of an evacuation posture of the virtual avatar when evacuating a fire according to a height of the head-mounted display device worn by the user, and activates a head tracking function of the head-mounted display device when switching to the fire evacuation virtual reality environment.

10. The extended reality-based fire training apparatus of claim 9, wherein the evacuation training simulation unit determines that evacuation training has failed when the user moves the virtual avatar to a fire occurrence location, the evacuation posture of the virtual avatar moves for more than a reference time while the height of the virtual avatar is greater than or equal to a reference value, or a virtual handkerchief object moves for more than the reference time while the virtual handkerchief object is not located on a part of a face of the virtual avatar, and terminates an evacuation training simulation.

\* \* \* \* \*